United States Patent
Krueger

(10) Patent No.: US 9,366,229 B2
(45) Date of Patent: Jun. 14, 2016

(54) WIND POWER PLANT HAVING AN ADJUSTABLE POWER RESERVE

(75) Inventor: Thomas Krueger, Tilst (DK)

(73) Assignee: Senvion SE, Hamburg (DE)

( * ) Notice: Subject to any disclaimer, the term of this patent is extended or adjusted under 35 U.S.C. 154(b) by 310 days.

(21) Appl. No.: 13/390,031

(22) PCT Filed: Aug. 12, 2010

(86) PCT No.: PCT/EP2010/004931
§ 371 (c)(1),
(2), (4) Date: Feb. 10, 2012

(87) PCT Pub. No.: WO2011/018222
PCT Pub. Date: Feb. 17, 2011

(65) Prior Publication Data
US 2012/0139247 A1 Jun. 7, 2012

(30) Foreign Application Priority Data
Aug. 12, 2009 (DE) .......................... 10 2009 037 239

(51) Int. Cl.
*F03D 9/00* (2006.01)
*H02P 9/04* (2006.01)
(Continued)

(52) U.S. Cl.
CPC ................ *F03D 7/0224* (2013.01); *F03D 9/02* (2013.01); *F05B 2270/1033* (2013.01); *F05B 2270/703* (2013.01); *Y02E 10/723* (2013.01)

(58) Field of Classification Search
CPC ..... F03D 7/0224; F03D 7/0284; F03D 7/048; F03D 7/02; F03D 7/0276; F03D 7/028; F03D 7/043; F03D 1/04; F03D 9/005

USPC .............................................. 290/44, 54, 55
See application file for complete search history.

(56) References Cited

U.S. PATENT DOCUMENTS 8,610,298 B2 * 12/2013 Acedo Sanchez et al. ..... 290/44
2003/0155773 A1 8/2003 Wobben
(Continued)

FOREIGN PATENT DOCUMENTS

DE 10022974 11/2001
DE 102007036446 2/2009
(Continued)

OTHER PUBLICATIONS

Machine translation of WO2005/025026.*
Machine translation of EP2009282.*
Machine translation of WO 2009113605.*
Ramtharan et al., "Support for Spinning Reserve from DFIG based wind turbines," Aug. 11, 2007.*
(Continued)

*Primary Examiner* — Tulsidas C Patel
*Assistant Examiner* — Thomas Quigley
(74) *Attorney, Agent, or Firm* — Morrison & Foerster LLP

(57) ABSTRACT

A wind power plant, including a generator driven by a rotor in order to generate electrical power and a controller that includes a pitch module for adjusting a pitch angle of blades of the rotor. The controller has an input for a required power reserve and determines a target pitch angle depending on an operating point of the wind power plant. A secondary pitch controller is also provided, which includes a detector for available power and a dynamic offset module. Input signals for the available reserve power determined by the detector, the required reserve power and the generated electrical power are applied to the dynamic offset module, which is designed to determine a value for a pitch angle offset. An activation element varies the target pitch angle by the pitch angle offset.

13 Claims, 3 Drawing Sheets

(51) Int. Cl.
*F03D 7/02* (2006.01)
*F03D 9/02* (2006.01)

(56) References Cited

U.S. PATENT DOCUMENTS

2007/0090651 A1 4/2007 Wobben
2009/0033096 A1 2/2009 Jurkat

FOREIGN PATENT DOCUMENTS

| EP | 1 672 779 | 6/2006 |
| EP | 2 009 282 | 12/2008 |
| EP | 2 020 506 | 2/2009 |
| EP | 2 028 368 | 2/2009 |
| WO | WO-2005/025026 | 3/2005 |
| WO | WO-2009/024833 | 2/2009 |
| WO | WO 2009112605 A1 * | 9/2009 |

OTHER PUBLICATIONS

International Search Report mailed Jul. 21, 2011, directed to International Application No. PCT/EP2010/004931; 7 pages.

Lubosny, Z. et al. (2007). "Supervisory Control of a Wind Farm," *IEEE Transactions on Power Systems* 22(3):985-994.

Prillwitz, F. et al. "Primaerregelung mit Wndkraftanlagen" *ETG-Workshop Neue dezentrale Versorgungsstrukturen*, located at <www.e-technik.uni-rostock.de/ee/download/publications_EEV/uni_hro_pub133_etg_frankfurt_2003.pdf> visited on Feb. 8, 2010. (4 pages).

International Preliminary Report on Patentability mailed Feb. 14, 2012, directed to International Application No. PCT/EP2010/004931; 11 pages.

Prillwitz, F. et al. (2003). "Primary Control of Wind Turbines," University of Rostock, Institute for Electric Energy Systems, with English translation of Abstract. 7 pages.

* cited by examiner

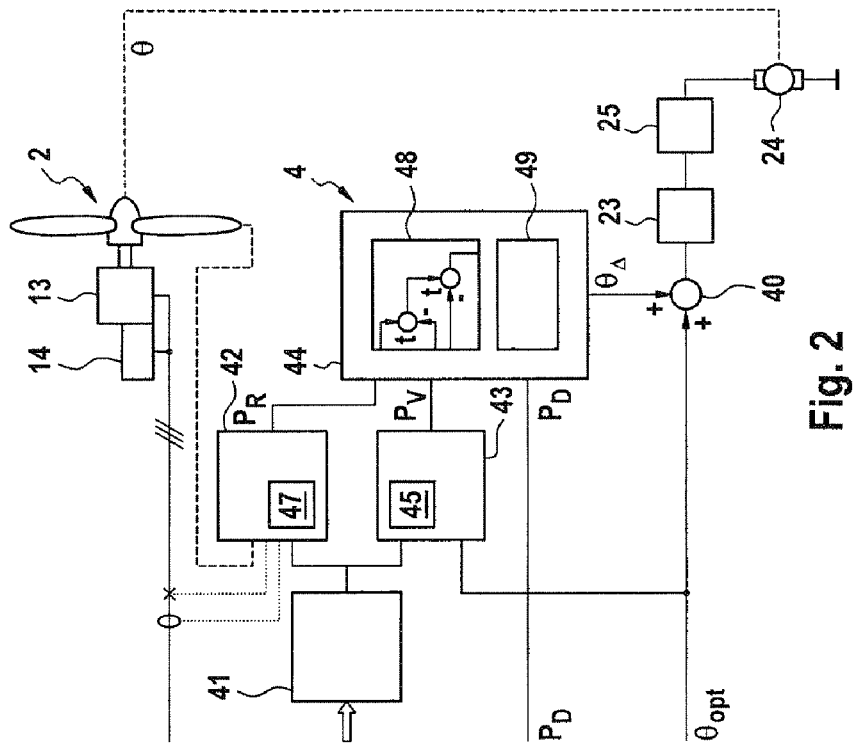
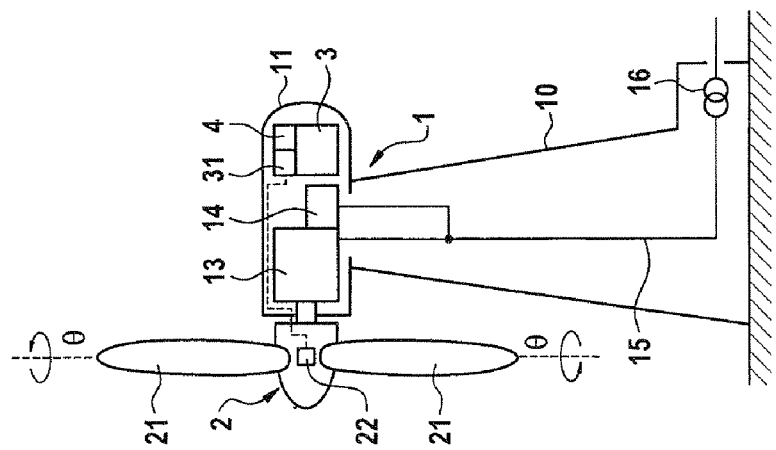
Fig. 2
Fig. 1

WIND POWER PLANT HAVING AN ADJUSTABLE POWER RESERVE

CROSS-REFERENCE TO RELATED APPLICATIONS

This application is a national stage application under 35 USC 371 of International Application No. PCT/EP2010/004931, filed Aug. 12, 2010 which claims the priority of German Patent Application No. 10 2009 037 239.3, filed Aug. 12, 2009, the contents of which prior applications are incorporated herein by reference.

FIELD OF THE INVENTION

The invention relates to a wind energy installation having a generator, which is driven by a rotor, for producing electrical power. To be more precise, the invention relates to a wind energy installation having a rotor, which has variable-pitch blades and whose pitch angle is controlled by a wind energy installation controller. In this case, the controller determines the pitch angle to be set as a function of an operating point of the wind energy installation and an applied input signal for a power reserve to be maintained.

BACKGROUND OF THE INVENTION

As wind energy installations become increasingly widely used, they are increasingly also used to regulate and protect the power transmission grid. The range of objects of the wind energy installations is therefore no longer restricted just to simple production of electrical energy, but is extended to the provision of so-called system services, which the grid operators require in order to maintain stable grid operation. In addition to feeding reactive power, these system services also include the provision of a real-power reserve (so-called regulation reserve). If the power consumption in a grid system exceeds the power production, then the grid frequency falls; conversely, the grid frequency rises when the power fed in exceeds the power consumed. Since frequency changes such as these are undesirable, their occurrence is reacted to by feeding in additional power (if the frequency is low) or reducing the power fed in (if the frequency is high). In order to allow a quick reaction here, even at short notice, appropriate power-station capacities must continuously be kept available (so-called second reserve). This is supplemented by power-station capacities which can be brought on line quickly when required (so-called minutes reserve). The setting up and operation of these power stations is very expensive (particularly in the second reserve area). Particularly in the case of grid systems where a relatively large number of wind energy installations feed power in, in addition to conventional power stations, there is therefore also a requirement for the wind energy installations to be used to provide the regulation reserve. One particular difficulty in this case is that, although wind energy installations can reduce their power output (DE 100 22 974 A1), it is not easily possible to increase their power—in contrast to conventional power stations—since the maximum available power is restricted by the available wind, and therefore fluctuates stochastically.

In order nevertheless to also allow wind energy installations to be used to provide regulation power, various approaches have become known in the prior art. In one widely used approach, use is made of the fact that wind energy installations are normally combined to form wind farms. Here, a wind energy installation (reference installation) is operated with the full power provided by the respective wind conditions, and the electrical power produced by it is used as a reference for the other wind energy installations in the farm. Depending on the desired power reserve, these other installations are then operated on a restricted basis, thus allowing additional power to be mobilized quickly when required, by removing the restriction. This quite simple concept in principle works, but has the disadvantage that discrepancies in the maximum power capability between the individual wind energy installations in the wind farm are not taken into account by the conditions found at the reference installation. There is therefore no guarantee that the desired regulation power will also actually be available, and in fact this is random.

It is also known for an anemometer to be used to measure the actually prevailing wind speed, and for the power available from this wind to be determined on the basis of a characteristic determined for the respective wind energy installation (DE 10 2007 036 446 A1). This value represents the available power, from which a certain amount is subtracted as the power to be kept in reserve (regulation power). The value which then results is set as a modified power nominal value by the operation controller for the wind energy installation. One advantage of the method is high transparency in its own right, but it has the disadvantage that errors in the measurement of the wind speed are passed through in their entirety to the result. This has a particularly serious effect, because the measurement of the wind speed at the wind energy installation by means of an anemometer arranged on the nacelle is known to be imprecise. Because of this, instabilities may occur, particularly when the discrepancies accumulate over a relatively long time period. This applies in particular to the secondary regulation, since this relates to a longer time period than the rapid primary regulation (also referred to as the second reserve).

It is also known for the kinetic energy stored in the rotor to be used for rapid mobilization of additional power. This is done by producing more electrical power than is provided per se by the rotor in the given wind conditions, by increasing the generator torque. This admittedly makes it possible to mobilize additional power very quickly, virtually independently of the currently prevailing wind conditions, but this is at the expense of a falling rotor rotation speed, and can therefore be carried out only over a short time period. The use of this method is therefore restricted to the primary regulation area.

It is also known for wind energy installations not to be operated with values defined per se by the operation controller for the respective operating point, in particular for the pitch angle, but in this case to reduce them by a safety margin (Prillwitz, F. et al.: Primärregelung mit Windkraftanlagen [Primary regulation with wind power installations], ETG-Workshop "Neue dezentrale Versorgungsstrukturen" [New decentralized supply structures], 19-20 Feb. 2003, Frankfurt am Main). With respect to the pitch angle, this means that the installation is operated with a pitch angle reduced by a fixed amount (safety margin). Since the installation therefore does not run with the optimum pitch angle, this results in a power reserve which can be mobilized by setting the pitch angle to the optimum value. One disadvantage of the method is that, because the pitch angle is reduced statically by a fixed amount, different power reserves result, depending on the installation operating point. While this may still be acceptable for the primary regulation in the seconds area (since the operating point normally does not vary or varies only slightly over a few seconds), a response such as this is significantly disadvantageous for the secondary regulation, which relates to a longer time period.

SUMMARY OF THE INVENTION

Against the background of the most recently cited prior art, the invention is based on the object of improving the provision of regulation power for a wind energy installation of the type mentioned initially, while in particular avoiding instabilities.

The solution according to the invention resides in the features as broadly described herein. Advantageous developments are the subject matter of the detailed embodiments described below.

In the case of a wind energy installation having a generator, which is driven by a rotor, for producing electrical power and having a controller which has a pitch module for adjusting a pitch angle of blades of the rotor, and with the controller having an input for a power reserve to be maintained and determining a nominal pitch angle as a function of an operating point of the wind energy installation, according to the invention, a secondary pitch regulator is provided, which comprises a detector for an available power and a dynamic offset module, with input signals for the available power reserve, which is determined by the detector, the required power reserve and the electrical power produced being applied to the dynamic offset module, and the dynamic offset module being designed to determine a value for a pitch angle offset, and an activation element also being provided, which varies the nominal pitch angle by the pitch angle offset.

The essence of the invention is the idea of defining a value for the available power and of using this for the calculation of a variable pitch angle offset—to be more precise using the difference from the actually produced power. This link, in particular the variability of the pitch angle offset, allows the offset required for the desired regulation power to be determined taking account of the present operating point of the wind energy installation. This allows the pitch angle offset to be optimally matched with the respective operating conditions of the wind energy installation. This optimized matching reliably avoids the inherent disadvantage of a static offset, specifically that it has to be chosen to be unnecessarily large in order to be sufficient for each operating choice. Overall, therefore, this results in optimum utilization of the power of the wind energy installation.

A further advantage of the invention is the high regulation stability. Surprisingly, it has been found that although the regulation is now only indirect (specifically via the offset of the pitch angle) as a result of the action on the pitch angle, instead of direct variation of the required nominal power, measurement errors and measurement inaccuracies in the input signals (in particular resulting from unavoidable measured value noise) have a much lesser effect, however, than when the power is directly preset, as known from the prior art. The regulation of the power reserve is therefore more stable and, because the actuation activity of the pitch drive is reduced owing to the reduced influence of the noise, it is also more protective in operation. Nevertheless, the regulation is sufficiently fast, despite this indirectness. This applies in particular to use as secondary regulation, which until now was highly problematic for wind energy installations.—Finally, it should also be noted that the required additional complexity is low. The required regulators and detectors can be implemented with little complexity in the operation controller and, because of the protective indirect regulation, the actuating drive for the pitch angle does not need to be additionally reinforced.

A wind estimation module is preferably provided for the detector and is designed to determine the available power by means of a model on the basis of the estimated wind speed. A model-based estimate of the wind speed such as this avoids inaccuracies and disturbances, such as those which are included in a real measurement by means of an anemometer. Surprisingly, it has been found that the data obtained is of considerably higher quality for determination of the available power, in particular because its noise spectrum is very much reduced in comparison to real measured values. Continuing this idea, a determination element for the actually produced power is preferably designed such that it is likewise model-based. This makes it possible to also achieve the same advantages with respect to the actually produced power. According to a further aspect, it is particularly preferable to use the same model as the basis for both the estimation of the available power and for the actually produced power. In particular, this offers the advantage that certain model errors (which are virtually unavoidable because of the simplifications required for the model) partially cancel one another out. This therefore results in a form of common-mode suppression, as a result of which the overall modeling has considerably better long-term stability. This also makes it possible to manage with relatively simple models, thus making it possible to avoid the difficulties, in particular stability problems, which frequently occur with complex models.

The use of a closed formula has been found to provide expedient modeling, with the total power being determined from the overall efficiency, the air density, the rotor circle area, the high running speed and the pitch angle, taking account of the third power of the estimated wind speed. A closed formula such as this allows accurate calculation without recursions. Alternatively, however, it is also possible to provide a look-up table (LUT). In particular, this offers the advantage of a high processing rate.

Expediently, the dynamic offset module comprises an I regulator. This offers the advantage of high steady-state accuracy. Any noise in the input signals is highly damped thanks to the integration, thus correspondingly protecting the actuating drive for the pitch angle. Thanks to the concept according to the invention of indirect control via the pitch angle, an I regulator such as this is also sufficiently fast that there is no need for a P element. However, the possibility of providing the regulator with an additional P component and D component should not be precluded.

In a wind farm having a plurality of wind energy installations, at least one of which has the determination of the regulation power according to the invention, it is expedient for this determination to be carried out by the farm master. This has the advantage of central processing, which is advantageous particularly when a plurality of wind energy installations are supplied with corresponding values for the regulation power. A balance module is expediently provided for this purpose in the farm master. This is designed to distribute the total regulation power required by the wind farm between the individual wind energy installations. For this purpose, the balance module preferably has a weighting unit, which is designed to provide the proportion of the respective wind energy installation on the basis of the rating of the individual wind energy installation.

However, it is also possible to design the balance module to operate individual wind energy installations in the wind farm in a coasting mode, and for these to be used for the regulation power. In this case, a coasting mode means that, although a wind energy installation is rotating, it does not produce any real power, or only a very small amount (a power of ten less than the others). These wind energy installations are then used for the regulation reserve, since the power actually demanded from them can be greatly increased. This concept is particularly advantageous when very different wind conditions occur across the farm, in a wind farm, the result of which is that wind energy installations in weak wind zones can be used well to provide the regulation reserve and, in the process, reductions in the actually produced real power during normal operation can be minimized. However, in order to unify the load, it is also possible for the regulation power to be distributed on the basis of the availability of the installations.

BRIEF DESCRIPTION OF THE DRAWINGS

The invention will be explained in the following text with reference to the attached drawing, in which one advantageous exemplary embodiment is illustrated, and in which:

FIG. 1: shows a schematic view of a wind energy installation according to one exemplary embodiment of the invention;

FIG. 2: shows a block diagram showing a device for pitch adjustment;

DETAILED DESCRIPTION OF THE INVENTION

Figure 3:
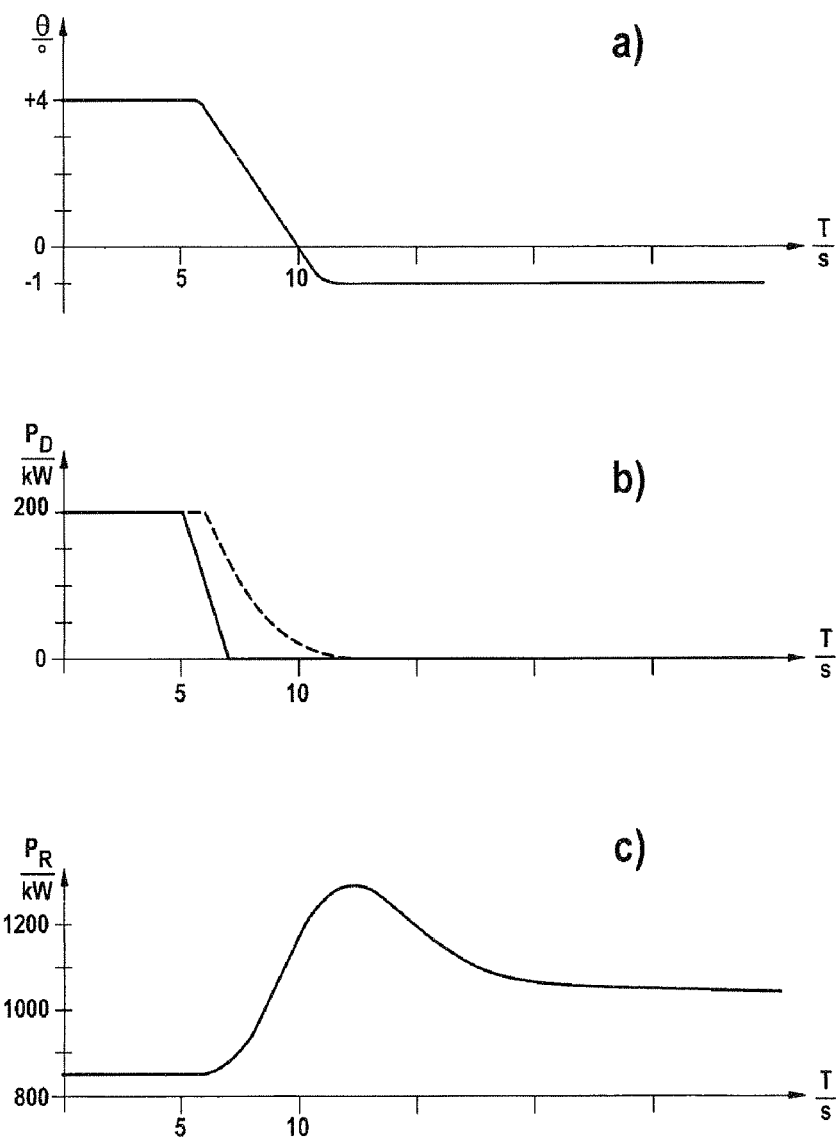
FIG. 3: shows graphs which illustrate the profile of the pitch angle and of the required and actually supplied power.

A wind energy installation 1 according to one exemplary embodiment of the invention comprises a tower 10 at whose upper end a nacelle 11 is arranged such that it can pivot in the azimuth direction. A wind rotor 2 is arranged such that it can rotate on an end face of the nacelle 11. Via a rotor shaft, this wind rotor 2 drives a generator 13, which converts the mechanical power produced by the rotor 2 to electrical power. In the illustrated exemplary embodiment, the generator 13 is in the form of a doubly-fed asynchronous machine, which is connected via a stator directly to a connecting line 15, and by its rotor via a converter 14 indirectly to the connecting line 15. The connecting line 15 leads to an installation transformer 16, which is preferably arranged in the area of the foot of the tower 10. The installation transformer 16 is connected to a power transmission grid system, with this generally being an internal grid system for a wind farm. An operation controller 3 is furthermore arranged in the nacelle 11 and is designed to monitor and control the entire operation of the wind energy installation. This comprises a pitch module 31, which is designed to control a pitch angle (Θ) of the rotor blades 21 of the wind rotor 2. For this purpose, the pitch module 31 interacts with a pitch system 22 which is arranged in the hub of the wind rotor 2. It comprises a regulation device for adjustment of the pitch angle, which is predetermined by the pitch module 31, by means of a pitch drive (not illustrated), which varies the pitch angle θ of the rotor blades 21.

The operation controller 3 together with the pitch module 31 is designed to in each case adjust the pitch angle θ so as to create an optimum value for the so-called tip speed ratio λ (the ratio of the blade tip speed to the wind speed). This makes it possible to achieve a maximum energy yield from the wind rotor 2 in the respective wind conditions. The value for the optimum tip speed ratio $\lambda_{opt}$ is made available by the operation controller 3 as a parameter for the pitch module 31.

Figure 5:
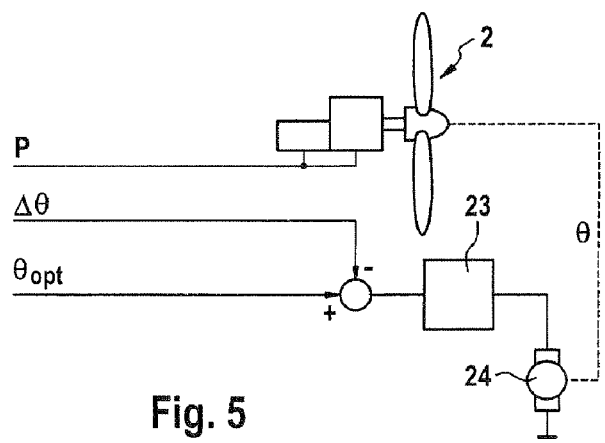
FIG. 5: shows a block diagram which illustrates pitch adjustment according to the prior art.

The design and method of operation of the controller 3 together with the pitch module 31 will be explained in more detail in the following text with reference to the schematic illustration in FIG. 2. The operation controller 3 uses the tip speed ratio λ to determine that value for the pitch angle $\theta_{opt}$ which, below the rated wind speed, leads to the wind rotor 2 being operated at the optimum tip speed ratio $\lambda_{opt}$; above the rated wind speed, the operation controller determines the pitch angle $\theta_{opt}$ which leads to the system remaining within the permissible rotation speed range. This optimum pitch angle $\theta_{opt}$ is output and is passed to an input of the pitch system 22 of the wind rotor 2, to be more precise to a pitch regulator 23 for the pitch system 22. The pitch regulator 23 drives an actuating motor 24 for the pitch system 22, which varies the pitch angle θ of the rotor blades 21. This operating mechanism, which is known per se, has also been extended in the prior art (see FIG. 5) by varying the nominal preset $\Theta_{opt}$ for the optimum pitch angle by a pitch angle discrepancy ΔΘ, which can be predetermined and is applied to the calculated value for an optimum pitch angle. A static preset for the discrepancy ΔΘ such as this for the pitch angle allows the wind energy installation to be operated in the sub-optimum range, as was explained initially in a discussion relating to the prior art, and as is illustrated schematically, for the sake of clarity, in FIG. 5.

The basic concept with the presetting of the optimum pitch angle to the pitch regulator 23, which in turn adjusts the rotor blades 21 via an actuating drive 24, has been adopted in the exemplary embodiment of the invention as illustrated in FIG. 2. However, an offset for the pitch angle is determined in a completely different manner, which will be explained in more detail in the following text. The dynamic secondary pitch regulator, which is annotated in its totality with the reference number 4, comprises a wind estimation module 41, a determination element for the electrical power 42 that is produced, a detector for an available electrical power 43 and a secondary controller 44. The wind estimation module 41 is designed to use data which is available in the operation controller 3 to calculate an estimated value for the currently prevailing wind strength. One special feature of the wind estimation module 41 is that it does not require its own sensors, but can be operated solely using measurement data which is available in any case in the operation controller 3 (that is to say, so to speak, passively). The value for the estimated wind speed $v_E$ as determined by the wind estimation module 41 is applied as an input variable to the detector 43 for the available power. As a further input variable, the value made available by the operation controller for an optimum pitch angle $\theta_{opt}$ is applied to the detector 43. The detector 43 uses this to calculate the theoretically available electrical power which is obtained from the wind in the currently prevailing wind conditions via the wind rotor 2 when optimally set, and could be output via the generator/converter system 13, 14. The detector 43 preferably has a model 45 for the wind energy installation in order to calculate the value of the available power $P_v$. The model 45 is preferably a simplified, non-linear model. This allows both accurate and rapid determination of the available power, because it is direct and therefore stable. In this case, the available power is determined using the formula:

$$P_V = \frac{\eta \rho A}{2} C_P(\lambda, \Theta_{opt}) v_E^3,$$

where η represents the overall efficiency, ρ the air density, A the rotor circle area, λ the tip speed ratio and $\theta_{opt}$ the optimum blade setting angle, and the value $v_E$ represents the estimated wind speed, as an input parameter for the model 45. On the basis of a model-based estimated value such as this, the detector 43 calculates a value for the available power $P_V$, outputs this at its output, and applies it to an input of the secondary controller 44.

The determination module for the actually produced power 42 determines the power which is actually produced and output by the generator/rotor system 13, 14. In the simplest case, sensors for the voltage and current 17, 18 are arranged for this purpose on the connecting line 15, and their values are connected to the determination element 42. The determination element 42 carries out a multiplication and uses this to determine the actually produced power from $P_R$. This simple case using the sensors 17, 18 is illustrated by dotted lines in FIG. 2.

In one preferred embodiment of the invention, the actually produced power $P_R$ can be determined by reference to the value provided by the wind estimation module 41 for the estimated wind speed $v_E$. For this purpose, the determination element likewise has a model 47 of the wind energy installation for the actually produced power 42. The model 47 is preferably designed in a corresponding manner to the model 45 for the detector 43. Furthermore, a value for the actually set pitch angle $\theta_R$ (see the dashed lines in FIG. 2) is applied to the determination element 42 from the pitch system 22. The actually produced power $P_R$ is determined from these values, by means of the model, using the following relationship:

$$P_R = \frac{\eta \rho A}{2} C_P(\lambda, \Theta_R) v_E^3,$$

where $P_R$ is the actually produced power and $\theta_R$ is the actually set blade angle. It is also possible to determine the actually produced power $P_R$ using sensors or data from the operation controller 3.

The actually output power $P_R$ determined in this way is applied via the output of the determination element 42 to an input of the secondary controller 44. A value for the magnitude of the power reserve $P_D$ to be maintained is applied to a further input of the secondary controller 44. The secondary controller 44 in the illustrated exemplary embodiment has an input filter 48 and a regulation core 49. The two values for the actually produced power $P_R$ and the available power $P_V$ are supplied as input signals to the input filter 48. The input filter 48 uses these to determine a difference value for the excess power $P_B$, and compares this with the applied value for the required reserve power $P_D$. The input filter determines therefrom a value for a power discrepancy $P_\Delta$, as an output signal. The value is applied as an input variable for the input filter 48 to the actual regulation core. The regulation core is designed to determine a value for a pitch error angle $\Theta_\Delta$ from this value. This value is output from the secondary controller 44, and is added, with the correct mathematical sign, via an addition element 40 to the value for the optimum pitch angle $\theta_{opt}$ supplied by the operation controller. This results in a modified value for the required pitch angle, which is applied as an input value to the pitch regulator 23, which is known per se.

Actually available reserve power can be calculated from the values, as determined by the determination element on the basis of the estimated wind speed, for the available power and the actually produced power as a difference, and is compared with the required power reserve (for example that required by the grid operator). If there is a discrepancy here, then the regulation core 49 of the secondary controller 44 produces an additional pitch angle $\Theta_\Delta$, which is added to the optimum pitch angle $\theta_{opt}$ supplied by the operation controller. The actuating drive 24 of the pitch system 22 sets this new setting angle, thus correspondingly changing the actually produced power. The control loop is thus closed.

It has been proven for the regulator contained in the regulation core 49 of the secondary controller 44 to preferably be in the form of a pure integral regulator. This results in very good steady-state accuracy, in which case it has surprisingly been found that the speed which can be achieved in this way is also sufficiently high. The invention has identified that, despite the use of a pure integral regulator, the stability can also be guaranteed since, because of the use of an estimated value for the wind speed, the determination elements for the actually produced and available power are decoupled from otherwise unavoidable measurement noise to such an extent that the integral regulator can be used without any risk of stability loss. It should be noted that the regulator may also be formed in a different manner, for example in the form of a PI or PID regulator, or else a state regulator.

For the sake of completeness, it should also be noted that the signal for the required power reserve $P_D$ is also fed into the operation controller, in order to reduce the power nominal value there by that value. This is known per se, and therefore does not need to be explained any further.

The effect of the invention will be explained in the following text with reference to FIG. 3. The figure illustrates a simulation of a power profile for rapid reduction of the required power reserve. FIG. 3a shows the pitch angle $\theta$, FIG. 3b uses a solid line to show the required power reserve, the dashed line to show the actually available power reserve, and FIG. 3c shows the actually produced electrical power $P_R$. It is assumed that, at the time T=5 ms, the required power reserve of 200 kW is reduced to 0 kW. This is based, as constraints, on a wind energy installation having a rating of 2000 kW, which produces a power of about 850 kW in partial load operation when the wind speed is 9 ms. In these conditions, optimum operation is obtained when the pitch angle $\Theta$ has a value of $-1°$.

Initially, the required power reserve is 200 kW. In order to make this available, an angle of +4° is chosen for the setting angle $\Theta$ of the rotor blades 21, rather than the optimum angle of $-1°$. Approximately 850 kW of electrical power is therefore actually produced in the stated conditions. The reduction in the required power reserve to 0 kW, starting at the time T=5 ms, results in the blade setting angle $\Theta$ being reduced at the maximum rate (1°/s) of the actuating drive 24, until the optimum pitch angle $\theta_{opt}$ of $-1°$ is finally reached. Because of the finite pitch adjustment rate, a reserve power is still available for a certain time (about 3 s), without this being required (see the dashed line in FIG. 3b). The actually produced power rises continuously when the pitch drive 24 is operated, until it reaches a maximum of 1200 kW when the optimum pitch angle is reached, and subsequently stabilizes at a value of about 1050 kW. On the basis of the difference between approximately 1050 kW and the start value of 850 kW, it can be seen that the originally required power reserve of 200 kW was actually provided by the wind energy installation. The process of passing through a power maximum, as shown in FIG. 3c, can be avoided by a power gradient limiting module 25 in the regulation, which power gradient limiting module 25 limits the pitch adjustment rate as a function of the measured or estimated rate at which the power rises. This makes it possible to ensure that no excessive power is fed into the grid system, avoiding any risk of destabilization of the grid system resulting from transient processes.

As can be seen from the graphs, the regulation with respect to the pitch angle has a highly harmonic profile and is free of overshoots and of long-lasting operations which involve material wear. In particular, there are no instabilities. The invention therefore offers the advantage that a power reserve in accordance with the requirements can be provided by relatively simple means, and in particular without the need for any additional hardware. The wind energy installation can therefore be used for system services, in particular for secondary regulation, in the grid system. The solution according to the invention is simple and can be implemented locally on the wind energy installation, with only a simple actuating signal being required from a grid control center or from the farm master. As can be seen from the illustration in FIG. 3c, the required power reserve can be maintained quite accurately, and this can be achieved according to the invention at all operating points, because of the two determination elements. Furthermore, the regulation according to the invention has no tendency to become unstable. This is not only advantageous for the operating behavior of the installation, but also protects the pitch adjustment drive 24, as a result of which it does not need to be used to a greater extent.

Figure 4:
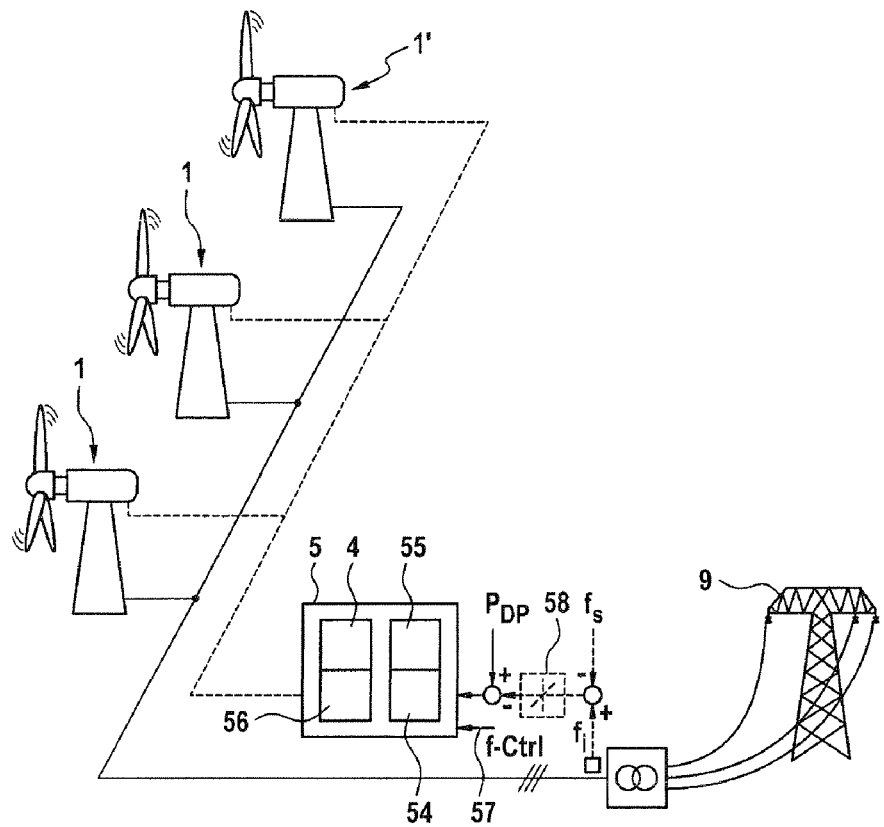
FIG. 4: shows a wind farm having a plurality of wind energy installations and a farm master according to the invention.

The invention is illustrated in the embodiment shown in FIG. 4, using the example of a wind farm. This consists of a plurality of wind energy installations 1, 1', which are connected to one another via an internal supply grid system 51, and are connected to the public grid system 9. Furthermore, the wind farm comprises a farm master 5, which carries out the management function for the wind energy installations 1, 1', with their operation control system, and is connected to them via a signal network 52. In this exemplary embodiment, the farm master 5 contains the secondary controller 4 for the individual wind energy installations 1, 1' in the wind farm. Furthermore, the farm master 5 comprises a balance module 54, which is designed to split a reserve power $P_{DP}$ required by the grid system operator between the individual wind energy installations 1, 1'. The corresponding output values for the individual values are connected to the secondary controller 4 for the individual wind energy installations 1. The balance module 54 can interact with a weighting module 55, which is designed to preferably use those wind energy installations 1, 1' for the provision of the reserve power which are producing only a small amount of power at that time, and therefore still have a reserve. Furthermore, a coasting module 56 can be provided, which uses specific wind energy installations 1', which are producing only one tenth or less of the average power of the rest of the wind energy installations, in a preferred manner to provide the regulation power.

The farm master 5 may additionally also comprise a static module 58 and a signal input 57. If a signal for frequency regulation f-Ctrl is applied to the signal input, a predeterminable reserve power $P_{DP}$ is activated for the wind energy installations. The static module 58 is used to store a function by means of which power reductions or increases in the wind farm are intended to be used to react to discrepancies between the actual frequency $f_i$ and the nominal frequency $f_s$, modifying the power preset and/or the preset of the reserve power, corresponding to the function, to the wind energy installations 1.

The invention claimed is:

1. A wind turbine comprising:
   a generator, which is driven by a rotor, for producing electrical power,
   a controller which has a pitch module for adjusting a pitch angle of blades of the rotor, the controller determining a nominal pitch angle as a function of an operating point of the wind turbine, the controller further having an input for a required power reserve,
   a secondary pitch regulator comprising:
      a detector configured to determine an available power, the available power being an electrical power that is theoretically obtainable in prevailing wind conditions via the rotor and the generator,
      a dynamic offset module, with input signals for the available power, the required power reserve, and the electrical power produced, wherein the dynamic offset module is configured to determine a value for a pitch angle offset, and
      an activation element configured to vary the nominal pitch angle by the pitch angle offset.

2. The wind turbine of claim 1, wherein the detector has a wind estimation module and is configured to determine the available power based on a model on the basis of the estimated wind speed.

3. The wind turbine of claim 2, further comprising a determination element configured to determine the electrical power produced based on a model.

4. The wind turbine of claim 3, wherein the determination element utilizes the same model as the detector.

5. The wind turbine of claim 2, wherein the model is formula-based.

6. The wind turbine of claim 2 wherein the dynamic offset module has an I regulator.

7. The wind turbine of claim 6, wherein the dynamic offset module has an output at which the required power reserve is output and is applied as a correction signal to the controller.

8. A wind farm having a plurality of wind turbines of claim 1, wherein a balance module, which is configured to distribute the required power reserve between the wind turbines apportioned to a rated power of the wind turbines, is arranged at a farm master, to which the wind turbine is connected.

9. The wind farm of claim 8, wherein the balance module is configured to operate some of the wind turbines in the wind farm in a coasting mode.

10. The wind farm of claim 8, wherein the dynamic offset module is also provided at the farm master.

11. The wind farm of claim 8, wherein the balance module interacts with a weighting module, which is configured to split the required power reserve on the basis of the availability of the wind turbines.

12. The wind farm of claim 8, further comprising a static module, which increases or decreases the required power reserve as a function of a discrepancy between an actual grid frequency and a nominal grid frequency.

13. The wind farm of claim 8 wherein the balance module is configured to operate some of the wind turbines in the wind farm in a coasting mode to regulate power.

* * * * *